United States Patent Office 3,223,480
Patented Dec. 14, 1965

3,223,480
CHEMICAL LEAVENING ACID
Reginald E. Vanstrom, Crete, Ill., assignor to Stauffer Chemical Company, New York, N.Y., a corporation of Delaware
No Drawing. Continuation of application Ser. No. 172,852, Feb. 13, 1962. This application Feb. 8, 1965, Ser. No. 431,179
1 Claim. (Cl. 23—107)

This application is a continuation of my co-pending application, U.S. Serial No. 172,852, filed February 13, 1962, now abandoned.

The invention hereinafter disclosed is directed to a new leavening compound, specifically a new complex crystalline sodium aluminum acid orthophosphate, and its method of manufacture.

There are today three known compounds classified as sodium aluminum acid orthophosphates. The compound of the formula, $NaAl_3H_{14}(PO_4)_8 \cdot 4H_2O$ (disclosed in U.S. 2,550,490), usually given the generic name sodium aluminum phosphate, or simply SAP, is presently the most important commercial compound of the group. A more recent compound is the dehydrated form of SAP having the formula $NaAl_3H_{14}(PO_4)_8$, see, e.g., U.S. Patent 2,957,750. The amorphous compound of the formula $NaRl_3H_{11}(PO_4)_7 \cdot 5-8H_2O$ was disclosed in U.S. Patent 2,995,421. These known sodium aluminum acid orthophosphates are useful, for example, as leavening agents for a variety of baked goods, as melt-controlling additives for cheese and as fat-binding additives for meat.

I have now discovered a new complex sodium aluminum acid orthophosphate. This new compound is a finely divided, free-flowing, white particulate material which exhibits a pH of 2.9 in a 1% solution, and will react slowly with bicarbonate of soda in the presence of moisture to liberate carbon dioxide gas. Its principal utility lies in the baking art where it may be used as an all-purpose fast leavening acid.

The method which I prefer to use for preparing the new compound comprises, mainly, preparing a liquid reaction mixture having a stoichiometric ratio of Na:Al:P of about 4:2:8 and thereafter heating and agitating this reaction mixture to drive off excess water until a dry, crystalline product forms. In the usual practice, sodium hydroxide or carbonate and a trivalent inorganic aluminum compound (e.g., $Al_2O_3 \cdot 3H_2O$) are added to phosphoric acid (normally 75% acid or below) in the proper stoichiometric proportions while maintaining the acid between about room temperature and its boiling point. Ideally, the sodium reactant is added at a temperature between 40° C. and 60° C. and the trivalent aluminum compound between 90° C. and 120° C. But both additions can be made at the same time while preferably maintaining the reaction temperature between about 80° C. and 100° C. In any event, elevated temperatures increase, to a practical speed, the reaction rates between the sodium or aluminum compounds and the phosphoric acid.

After its formation, the viscous, translucent liquid reaction product of the sodium and aluminum additions to aqueous phosphoric acid must be dried to yield the final crystalline product. Suitable drying temperatures for the reaction mixture range between about 45° C. and 160° C., preferably between 80° C. and 120° C. As the reaction mixture is dried, it becomes progressively more viscous, turns opaque, and then finally begins to crystallize. The damp crystals are thereafter dried to a constant weight.

Both continuous and batch methods may be employed for the preparations of the compound of the present invention. One suitable industrial batch method comprises charging the phosphoric acid to a large heated reactor equipped with a paddle agitator, adding the sodium and aluminum compounds, and agitating (while varying the temperature of the reactor depending upon the stage of the process) until a dry white product is formed. Reaction and drying times will depend upon the particular mode selected for preparing the compound, i.e., whether continuous or batch, the amount of water initially present in the acid and the sodium and aluminum compounds, and the specific temperature selected for the different stages of preparation. Usually, the reaction time will not exceed thirty minutes, while the drying time can range between about thirty minutes and three hours.

My new compound may be readily identified by its reactivity, acidity, elemental analysis, X-ray diffraction pattern, etc., or by combinations of these factors. Among the various analytical tests which may be used, perhaps the most unequivocal and quickest means for characterizing my compound is by X-ray powder patterns. These show the presence of a distinct crystalline lattice which differs significantly from those of the two prior art crystalline sodium aluminum acid orthophosphates. For example, the $d$-spacings of the lines of greatest intensity for sodium aluminum phosphate (SAP) are at 2.99, 3.67 and 8.70 angstroms, while those for my compound are at approximately 3.41, 3.66 and 7.85 angstroms. A similar difference can be seen when comparing the major lines of dehydrated SAP, $NaAl_3H_{14}(PO_4)_8$, with my new compound. Table I shows the $d$-spacings and relative line intensities of the X-ray powder patterns of SAP, dehydrated SAP, and the compound of the present invention.

TABLE I

| Compound of the Present Invention | | SAP | | Dehydrated SAP | |
|---|---|---|---|---|---|
| $d$ | Intensity | $d$ | Intensity | $d$ | Intensity |
| A. | | A. | | A. | |
| 7.85 | 100 | 8.70 | 100 | 8.64 | 40 |
| 5.80 | 10 | 7.50 | 10 | 7.73 | 100 |
| 4.55 | 30 | 4.74 | 5 | 4.83 | 15 |
| 3.89 | 25 | 4.25 | 5 | 4.11 | 1 |
| 3.66 | 100 | 3.67 | 100 | 3.92 | 15 |
| 3.41 | 60 | 3.21 | 40 | 3.74 | 50 |
| 3.15 | 50 | 3.08 | ------ | 3.61 | 30 |
| 3.00 | 25 | 2.99 | 75 | 3.51 | 30 |
| 2.89 | 10 | 2.82 | 30 | 3.14 | 10 |
| 2.85 | 10 | 2.77 | 20 | 2.99 | 25 |
| 2.69 | 10 | 2.73 | 20 | 2.88 | 5 |
| 2.60 | 10 | 2.43 | 25 | 2.75 | 5 |
| 2.53 | 10 | 2.38 | 5 | 2.55 | 20 |
| 2.46 | 5 | 2.22 | 5 | 2.42 | 20 |
| 2.40 | 10 | 2.14 | 15 | 1.91 | 3 |
| 2.31 | 5 | 2.02 | 30 | 1.82 | 3 |
| 2.20 | 30 | 1.91 | 30 | | |
| 2.07 | 5 | 1.83 | 5 | | |
| 2.01 | 5 | | | | |
| 1.95 | 10 | | | | |

The relative intensities of Table I were estimated from X-ray film patterns by assigning values ranging from 0 for no lines, up to 100 for the lines of highest intensity. Slight corrections in the values were made to compensate for overall differences of image intensity between films, caused by the usual minor inconsistencies in exposure and development.

The following specific example illustrates the preparation and properties of the compound of this invention.

*Example*

In a Hobart mixer bowl fitted with a Glass Col heating mantle was placed 522.5 grams of 75% orthophosphoric acid. A dry mixture consisting of 106 grams of soda ash and 78 grams of hydrated alumina was then slowly added to the orthophosphoric acid. When the addition was complete the mixer bowl was heated to maintain the mixture at a temperature of 65°–75° C. and the paddle agitator was started. Agitation and heating were continued for about 2.5 hours during which time the mixture was observed to undergo reaction and a slow transition from a viscous fluid to a dry crystalline state. After cooling, the product was milled to pass a 140 mesh screen and dried to constant weight in a 55° C. oven (for about four hours). An elemental analysis of this product showed 26.1% P, 10.5% Na, and 6.0% Al. Loss on ignition was 15.5%. The X-ray powder pattern for this product is set forth in the first two columns of Table I, supra.

Using substantially the same procedure described in the above example, reaction mixtures were prepared in which the amount of sodium and aluminum constituents were varied. While holding the aluminum to phosphorus atomic ratio constant (Al:P=2:8), reaction products containing 3.5 and 5.0 gram atoms of sodium were prepared. Similarly, the aluminum constituent was varied between 1.5 and 2.5 gram atoms while the sodium was held constant at 4.0 gram atoms for each 8.0 gram atoms of phosphorus. The final dried products which resulted were analyzed by X-ray powder patterns. The product produced from an Na:Al:P ratio of 3.5:2:8 was found to be a mixture comprising my new compound and a second crystalline compound having a Na:Al:P ratio of 3:2:8 (disclosed in my co-pending U.S. patent application titled, Acid Orthophosphate, filed February 13, 1962, as U.S. Serial No. 173,054), the former in preponderance as indicated by greater intensity of its X-ray pattern. Increasing the sodium, to a Na:Al:P ratio of 5:2:8, yielded a mixture comprising my new compound and a minor amount of monosodium phosphate. When the sodium was held at 4 gram atoms and the aluminum decreased to about 1.5 gram atoms, the product showed a weak pattern having only the lines of my 4:2:8 compound. At 2.5 gram atoms of aluminum (Na:P=4:8) a small amount of $Al_2O_3$ and/or amorphous material appeared to be present in the final product together with my new compound. In summary, deviations from the theoretical stoichiometric ratio of 4:2:8 may result in the formation of various mixtures; but at a ratio of Na:Al:P near 4:2:8 my new compound will usually preponderate.

The compound of the present invention is suitable as a general purpose leavening acid for cakes, biscuits, and the like. Moreover, it ranks as a high quality leavening acid since it, like the other sodium aluminum acid orthophosphates, does not impart an off-taste to baked goods. Its "neutralizing value" a standard quantitative criterion of the baking art, ranges between about 85 and 90. Neutralizing value is a measurement of the parts by weight of bicarbonate of soda which will be neutralized by exactly 100 parts by weight of a given leavening acid. Essentially all of the prior leavening acids have neutralizing values falling within the range of about 60 to 115.

The present continuing application excludes the formula assigned to my novel compound in my prior application Serial No. 172,852, which formula now appears to be inaccurate.

The foregoing detailed description is given for clearness of understanding only, and no unnecessary limitations should be implied therefrom.

What I claim is:

A novel complex crystalline sodium aluminum acid orthophosphate which exhibits X-ray powder diffraction lines of mapor intensity at $d$-spacings of approximately 7.85, 3.66 and 3.41 angstroms prepared by reacting a compound selected from the group consisting of sodium hydroxide and sodium carbonate and a reactive trivalent inorganic aluminum compound with aqueous phosphoric acid, the reactants containing sodium, aluminum and phosphorus being added in proportions to provide a reaction mixture having a ratio of Na:Al:P of about 4:2:8 heating the resulting viscous reaction mixture between 45° C. and 160° C. until a dry crystalline product forms and recovering the dry crystalline product.

References Cited by the Examiner

UNITED STATES PATENTS

| | | | |
|---|---|---|---|
| 2,538,867 | 1/1951 | Greger | 23—105 |
| 2,550,490 | 4/1951 | McDonald | 23—107 |
| 2,550,491 | 4/1951 | McDonald | 99—95 |
| 2,774,672 | 12/1956 | Griffith | 23—106 X |
| 2,957,750 | 10/1960 | Knox et al. | 23—105 |
| 2,995,421 | 8/1961 | Dyer | 23—105 |
| 3,041,177 | 6/1962 | Lauck | 99—95 |

MAURICE A. BRINDISI, *Primary Examiner.*

UNITED STATES PATENT OFFICE
CERTIFICATE OF CORRECTION

Patent No. 3,223,480                           December 14, 1965

Reginald E. Vanstrom

It is hereby certified that error appears in the above numbered patent requiring correction and that the said Letters Patent should read as corrected below.

Column 2, line 71, for "Glass Col" read -- Glas Col --; column 4, line 24, for "mapor" read -- major --.

Signed and sealed this 20th day of September 1966.

(SEAL)
Attest:

ERNEST W. SWIDER                           EDWARD J. BRENNER
Attesting Officer                              Commissioner of Patents